United States Patent [19]
Mabry, Jr.

[11] 3,915,496
[45] Oct. 28, 1975

[54] DUMPING VEHICLE

[76] Inventor: Vern D. Mabry, Jr., 2560 Crowdis Lane, Rescue, Calif. 95662

[22] Filed: Mar. 19, 1974

[21] Appl. No.: 452,698

[52] U.S. Cl. .................................. 298/14; 298/1 A
[51] Int. Cl.² ............................................ B60P 1/30
[58] Field of Search ......... 298/1 R, 1 A, 11, 12, 14, 298/15; 214/146.5, 501, 502

[56] References Cited
UNITED STATES PATENTS

| | | | |
|---|---|---|---|
| 1,363,945 | 12/1920 | Williams | 298/14 |
| 1,633,364 | 6/1927 | Carvalho | 298/12 |
| 3,147,999 | 9/1964 | Daniels | 298/15 |
| 3,446,534 | 5/1969 | King | 298/1 A X |
| 3,630,571 | 12/1971 | Saldana | 214/1 A |

FOREIGN PATENTS OR APPLICATIONS

| | | | |
|---|---|---|---|
| 1,076,505 | 2/1960 | Germany | 298/12 |

*Primary Examiner*—Frank E. Werner
*Attorney, Agent, or Firm*—Blair & Brown

[57] ABSTRACT

A dumping vehicle that consists of a unit that is adapted to be placed in a pickup truck whereby loads or cargo can be conveniently dumped from the vehicle. The dumping vehicle includes a moveable body as well as a suitable jack mechanism for selectively tilting the body, and wherein there is also provided a latching or locking means for the unit.

9 Claims, 16 Drawing Figures

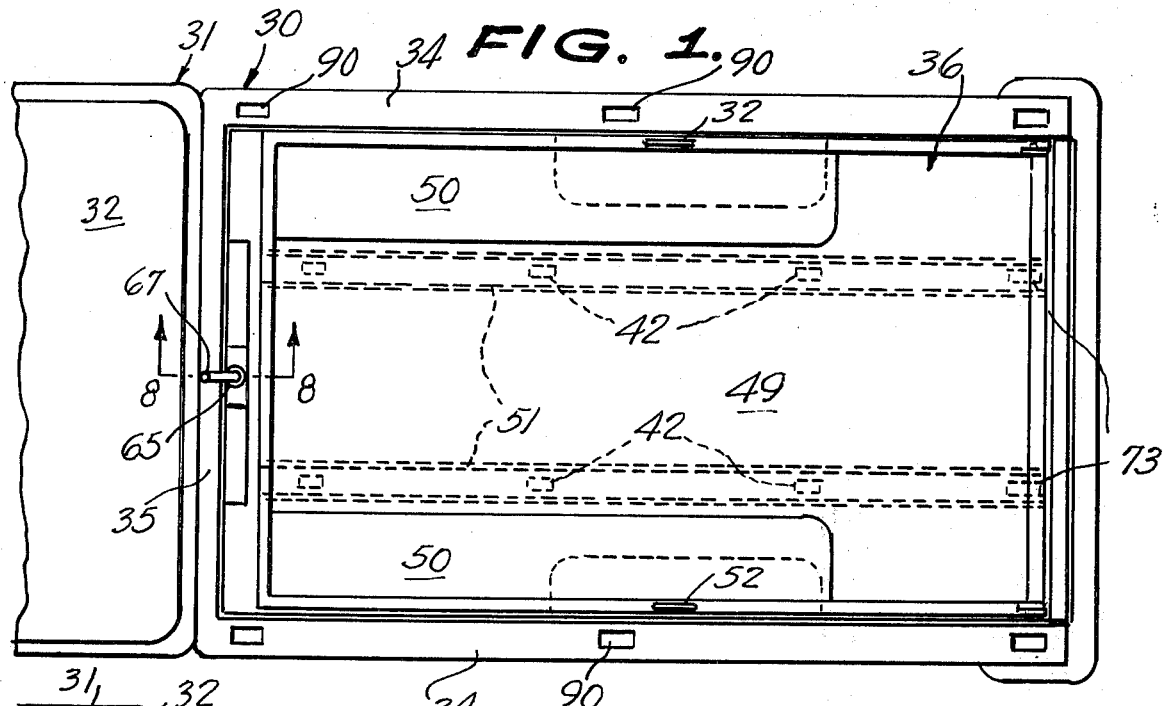
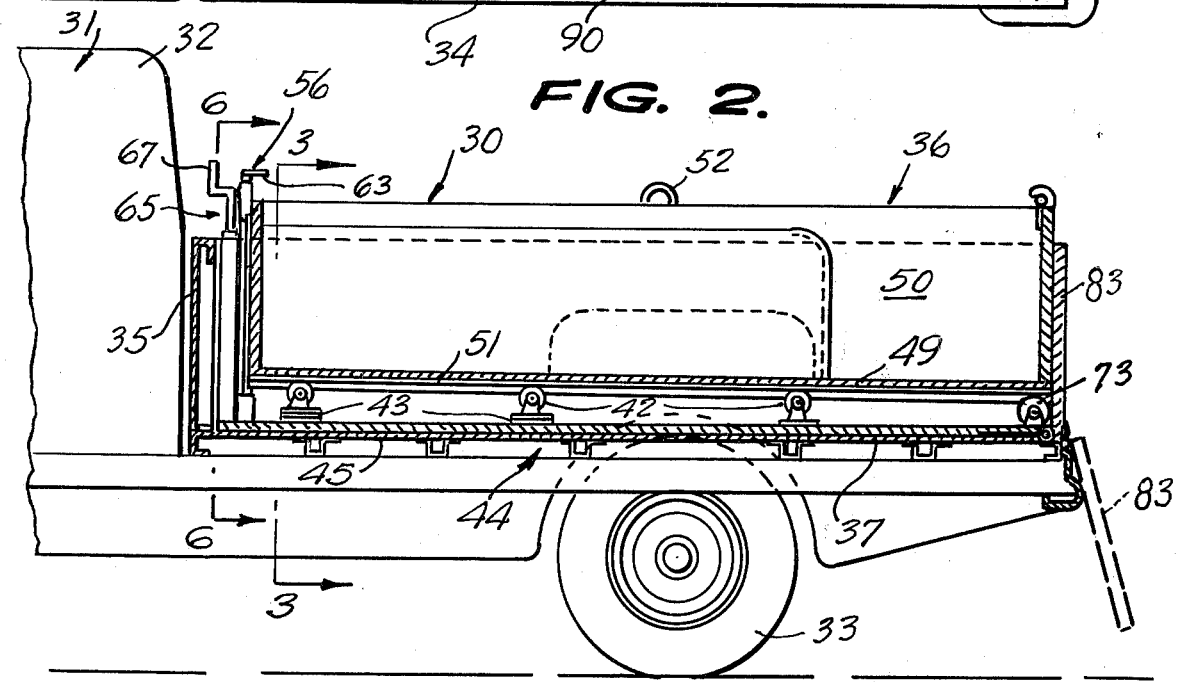
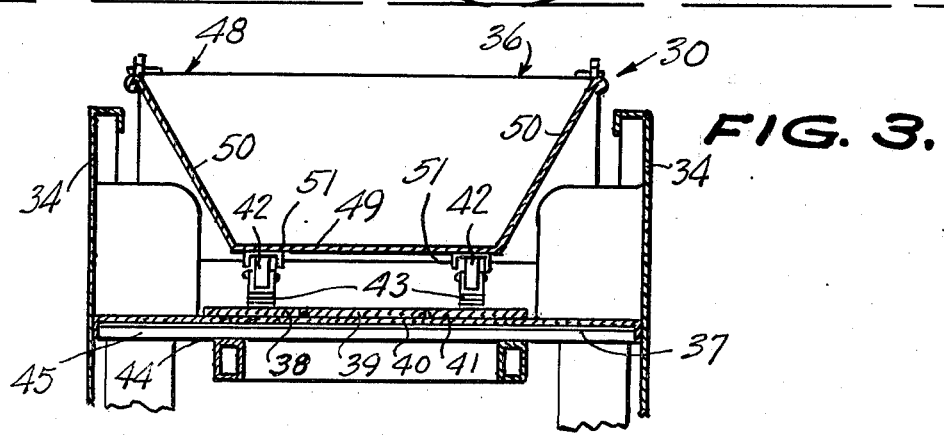

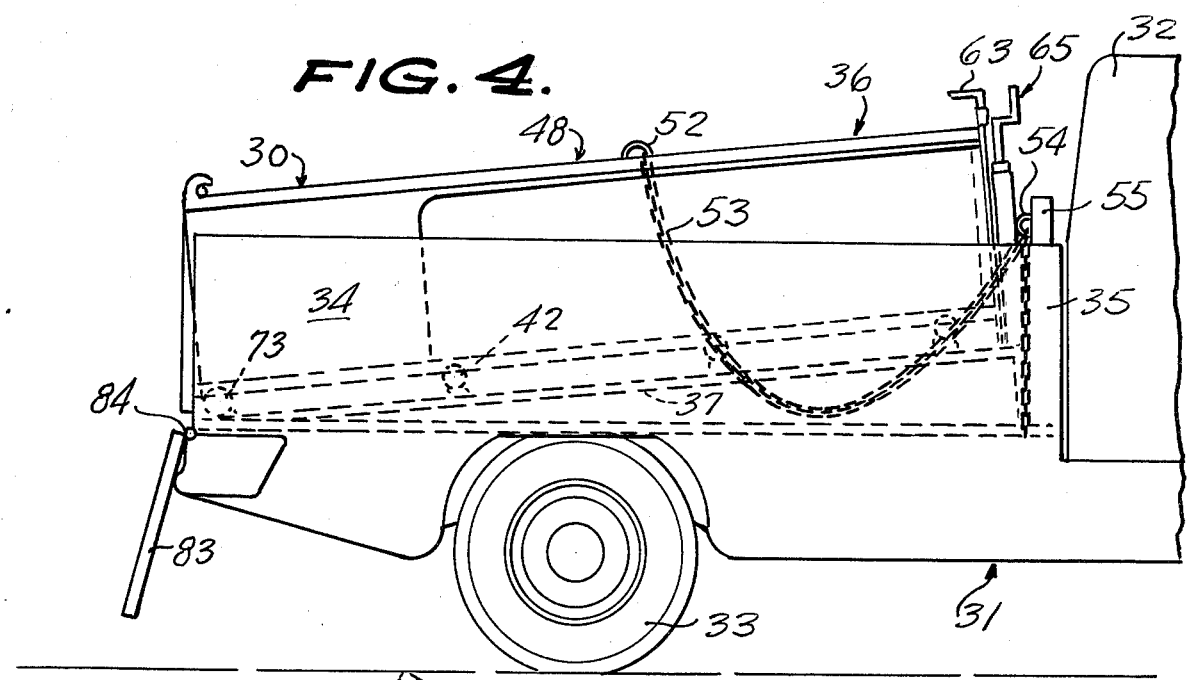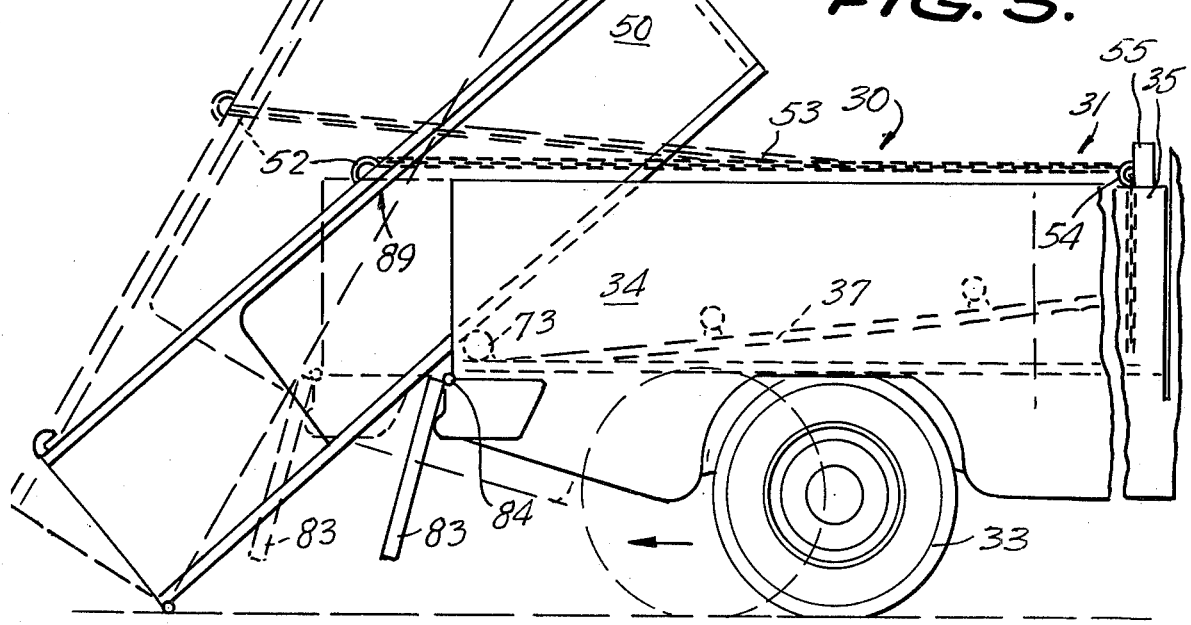

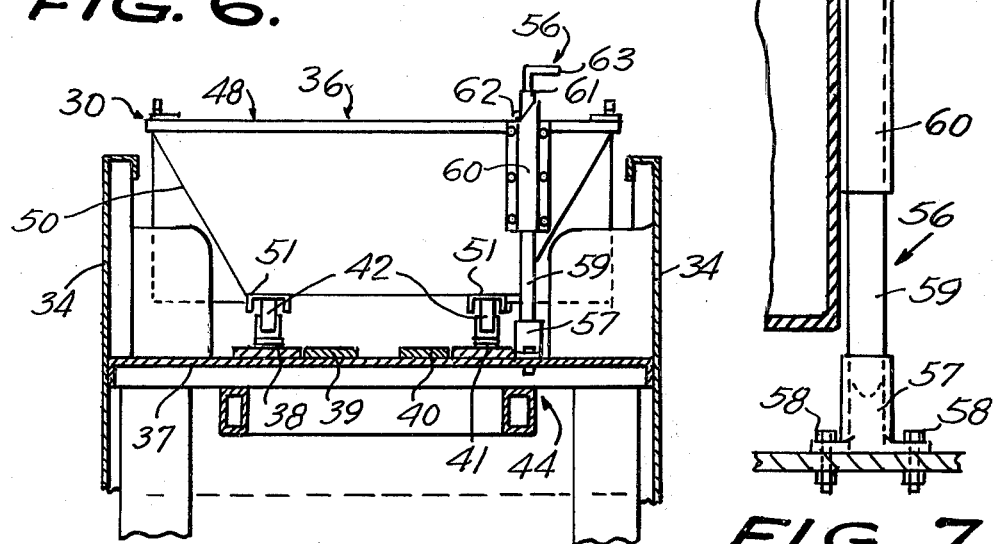
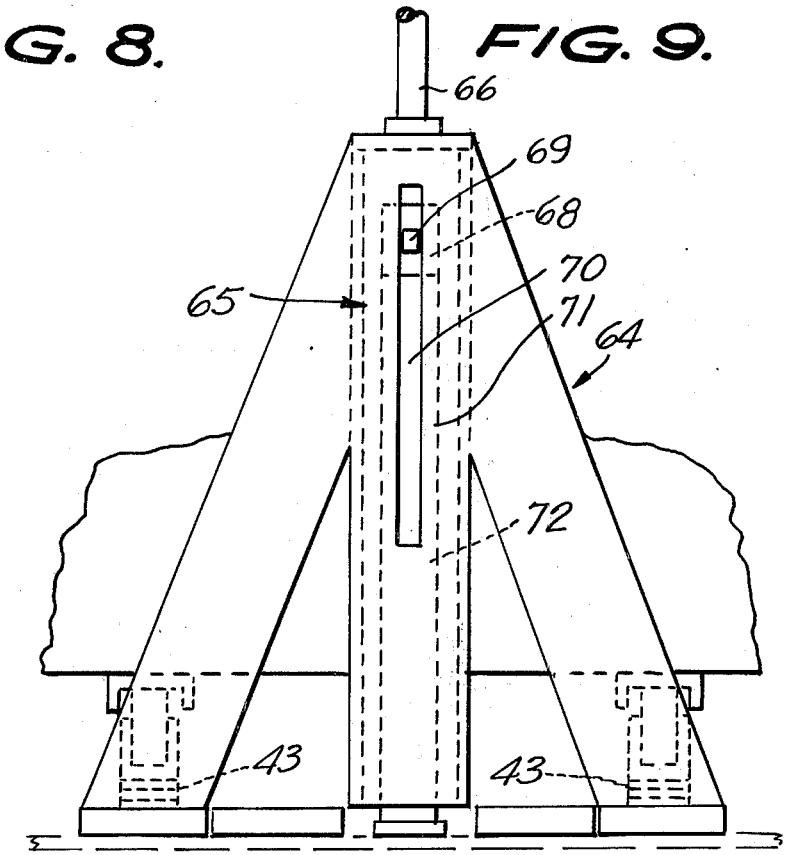

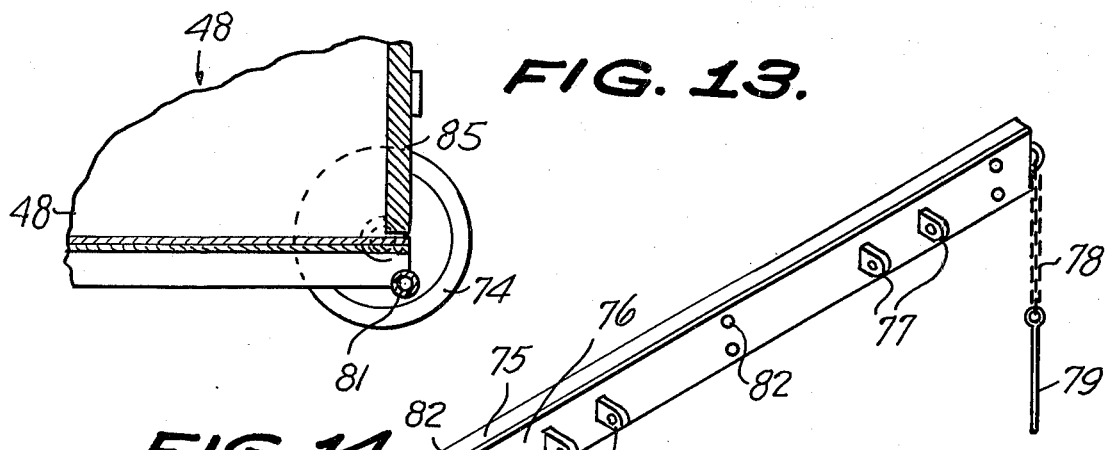
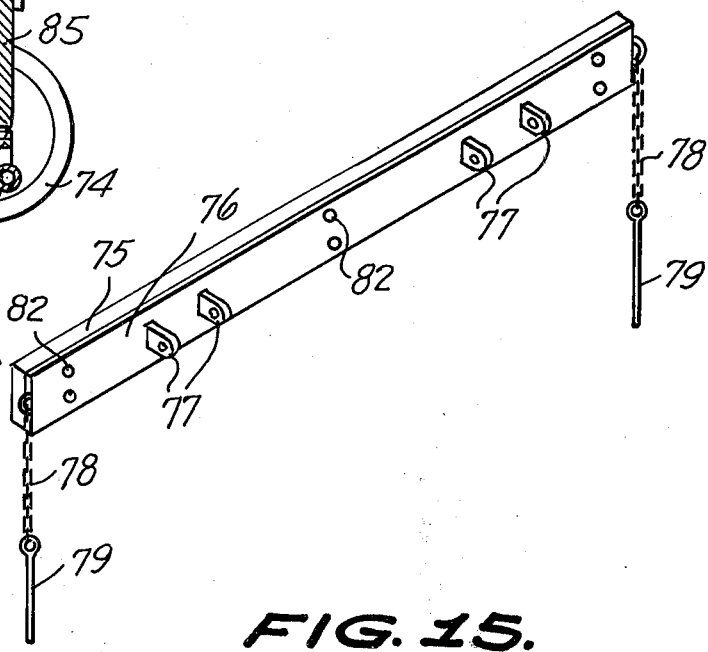
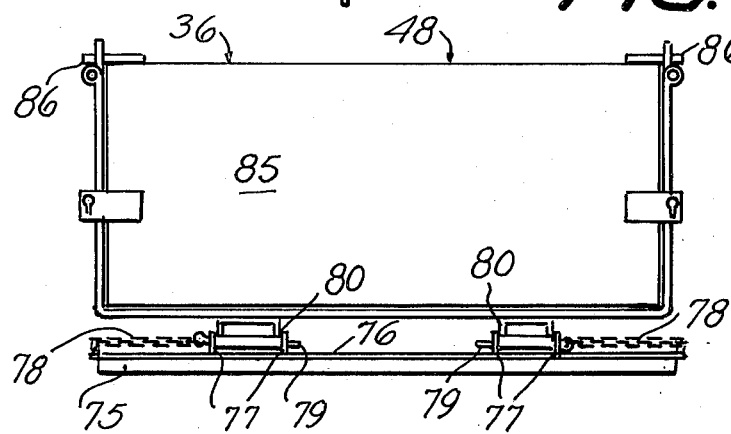
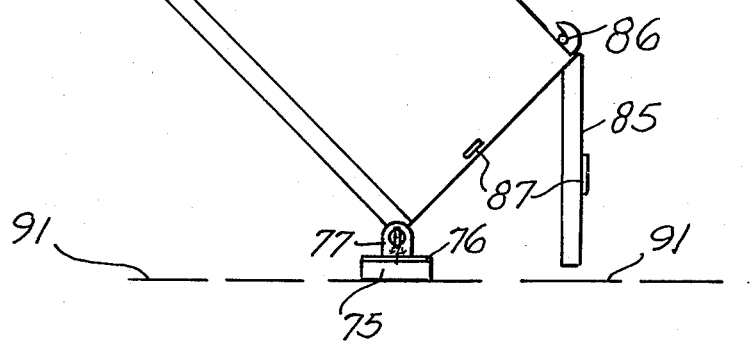

DUMPING VEHICLE

BACKGROUND OF THE INVENTION

FIELD OF THE INVENTION

The present invention relates to vehicles such as pickup trucks, and more particularly to a dumping body for such a vehicle.

SUMMARY OF THE INVENTION

A dumping vehicle is provided that includes a unit that is adapted to be placed in a conventional vehicle such as a pickup truck and wherein there is provided a means for permitting the body to move along the bed of the vehicle when cargo or a load is to be dumped. In addition there is provided a means for selectively tilting the body to dump the load. Also, a locking means is provided for assuring that the vehicle will not dump it's load inadvertently.

The primary object of the present invention is to provide a dumping vehicle that consists of a unit that is placed in the bed of a conventional pickup truck whereby unloading of cargo and the like will be greatly facilitated.

Still another object of the present invention is to provide a dumping vehicle that is ruggedly constructed and fool proof in use and which is relatively simple and inexpensive to manufacture.

Other objects and advantages will become apparent in the following specification when considered in light of the attached drawings.

BRIEF DESCRIPTION OF THE DRAWINGS

FIG. 1 is a top plan view of the dumping vehicle constructed according to the present invention;

FIG. 2 is a vertical sectional view thereof;

FIG. 3 is a sectional view taken on the line 3—3 of FIG. 2;

FIG. 4 is a side elevational view showing the auxillary body partially raised;

FIG. 5 is a view generally similar to FIG. 4 but showing the dumping body in dumping position and fully tilted;

FIG. 6 is a sectional view taken on the line 6—6 of FIG. 2;

FIG. 7 is an enlarged elevational view, with parts broken away and in section, showing a portion of the locking mechanism;

FIG. 8 is a sectional view taken through one form of jack mechanism and taken on the line 8—8 of FIG. 1;

FIG. 9 is an elevational view of the jack mechanism of FIG. 8;

FIG. 13 is a sectional view taken on the line 13—13 of FIG. 12;

FIG. 14 is a perspective view illustrating a unit for use with the dumping vehicle;

FIG. 15 is an end elevational view showing the unit of FIG. 14 being used with the dumping body; and FIG. 16 is a fragmentary side elevational view illustrating the parts of FIGS. 14 and 15 in use.

DESCRIPTION OF THE PREFERRED EMBODIMENT

Figure 10:
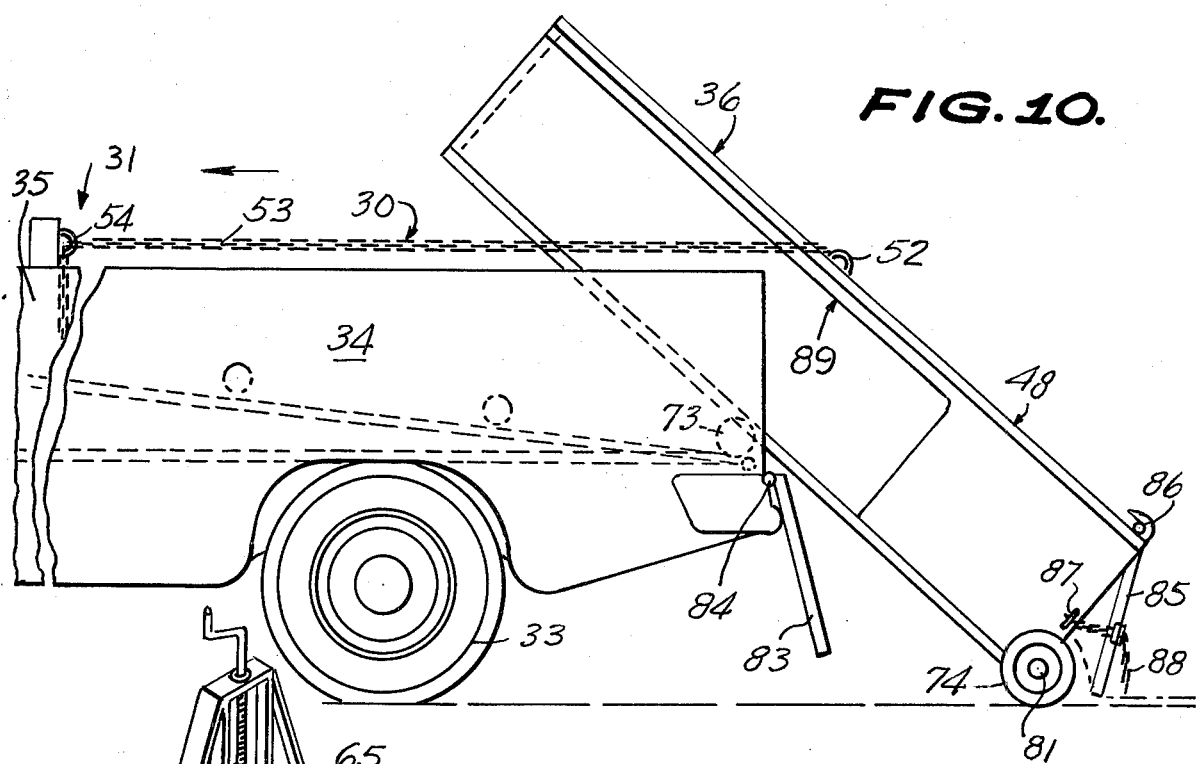
FIG. 10 is a side elevational view illustrating a slight modification.

Referring now to the drawings in detail, wherein like reference characters indicate like parts throughout the several figures, the reference numeral 30 indicates a dumping vehicle that includes or is in the form of a conventional pickup truck 31 that includes the usual cab 32, wheels 33 and stationary bed 44. The pickup truck 31 has the usual bottom 45 as well as the vertically disposed sides 34. And there is also provided the usual front section 35.

The numeral 36 indicates the unit of the present invention which is easily removed from the truck bed 44.

Figure 11:
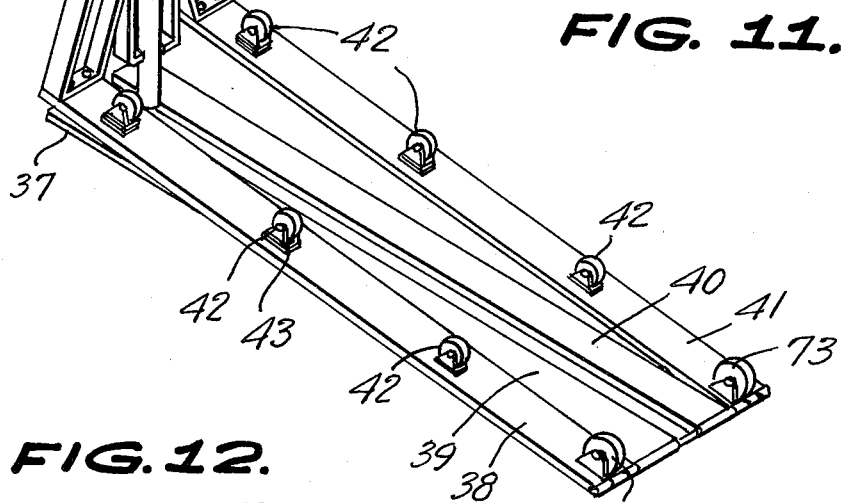
FIG. 11 is a perspective view illustrating the base and frame pieces and jack mechanism.
Figure 12:
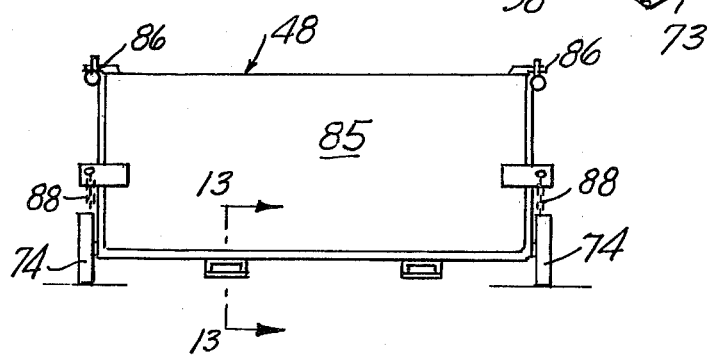
FIG. 12 is an end elevational view illustrating certain constructional details of the present invention.

As shown in the drawings the unit 36 includes a generally rectangular base or platform 37 that has a plurality of frame pieces 38, 39, 40 and 41 mounted thereon FIG. 11. A plurality of casters 42 are mounted on certain of the frame pieces such as the frame pieces 38 and 41 for purpose to be later described, and shims are selectively positioned below the casters 42.

The unit 36 includes a moveable dumping box or body 48 that has a flat bottom section 49 as well as inclined side walls 50, FIG. 3. A pair of channel members 51 are suitably secured to the lower surface of the bottom wall 49, and the channel members 51 slidably engage or receive the casters 42.

Suitable brackets 52 are secured to the upper side portions of the dumping body 48 intermediate the ends thereof, and chains 53 have their ends connected to the loops 52. The chains 53 are adjustably connected to loops or retainers 54 that are mounted on detachable pegs 55.

As shown in FIGS. 6 and 7 there is provided a locking mechanism for the dumping vehicle and the locking mechanism is indicated generally by the numeral 56. The numeral 57 indicates a bushing that is secured in place as at 58, and a rod 59 has it's lower end selectively engaging the bushing 57. The numeral 60 indicates a collar or sleeve that is arranged in engagement with the rod 59, and the sleeve 60 has an inclined cam portion 61 that is engaged by a pin 62 so that by properly moving a handle 63 the locking mechanism can be selectively locked or unlocked.

The numeral 64 indicates a support section that is suitably affixed to the front ends of the frame pieces as shown in FIG. 11, and a suitable jack 65 is operatively connected to the support section 64. The jack 65 is shown in detail in FIGS. 8 and 9 and may include a threaded shaft 66 that has a handle 67 on the upper end for rotating the same. The numeral 68 indicates a bushing that is arranged in threaded engagement with the shaft 66, and the bushing 68 is vertically moveable and has a projection or lug 69 extending therefrom, the projection 69 extending through a vertically disposed slot 70 in the outer member 71, and the jack may include an inner member 72. It is to be understood that the jack can have other constructions besides that shown in the drawings.

As shown in FIG. 11 enlarged casters or rollers 73 may be mounted on the rear end of the base frame pieces. The numeral 74 indicates wheels or rollers that may be journalled on the lower rear portions of the dumping body as at 81.

Referring to FIGS. 14, 15 and 16 of the drawings the numeral 75 indicates a support piece that can be selectively used, and the support piece 75 may be secured to a beam 76 as at 82. Apertured lugs or brackets 77 are adapted to be affixed to the beams 76, and chains 78 can be connected as shown in the drawings, and the chains 78 may have locking pins 79 thereon for engaging elements such as the elements 80.

The numeral 83 indicates the usual tailgate for the pickup truck which can be hingedly connected in place as at 84.

As shown in FIG. 16 the dumping body has a tailgate 85 that may be hingedly supported as at 86, and suitable latch or locking elements 87 can be provided for selectively maintaining the tailgate member 85 in closed position.

In FIG. 10 the numeral 88 indicates chains that can be used for helping to maintain or fasten the tailgate 85 in closed or locked position.

From the foregoing it will be seen that there has been provided a dumping vehicle, and in use with the parts arranged as shown in the drawings, the unit 36 of the present invention is adapted to be placed in the bed of a conventional vehicle such as the pickup truck 31. Then, when cargo in the box 48 is to be unloaded or dumped, the unit can be tilted or moved from a position such as that shown in FIG. 2 to a position such as that shown in FIG. 5 or FIG. 10 whereby the material or cargo in the box 48 can be readily and conveniently unloaded or dumped.

The parts can be made of any suitable material and in different shapes and sizes as desired or required.

The jack 65 can be actuated to tilt the dumping box when needed. Various accessories are provided such as the locking mechanism 56 which serves to maintain the dumping unit or box in a position such as that shown in FIG. 2.

When using pickup trucks, the user at many times is forced to unload cargo from the pickup bed by hand which could have been dumped on the ground. Almost all pickups have immoveable stationary beds and the cost of making and installing or buying a hydraulically operated dump bed for a pickup is prohibitive. The present invention provides a method and means for dumping cargo from a solid immoveable bed without the use of any hydraulics. The present invention includes the box such as the box 48 that has slightly smaller dimensions then the truck into which it fits. The box 48 is provided with the removeable tailgate 85. Also, the box has the locking mechanism 56 as previously described. The box rests upon a castered support mechanism which in turn is mounted to a piece of plywood that rests upon the floor of the pickup bed. The unit can be used with various types of pickups such as a narrow bed pickup, wide bed pickup and the like, and is easily removed when not in use.

In order to accomplish the dumping, a system of casters and rollers are provided. The casters 42 are secured as by bolts to frame pieces on a platform 37 that is placed in the bed of the truck. The dump bed is thus supported by the caster framework and this caster framework will allow the dump bed to roll off the truck and dump it's load. To help guide the bed off the truck, channel members 51 are placed on the bottom of the dump bed and the casters roll within the channel members 51.

In order to facilitate easy off load of heavy cargo the caster mechanism is slightly elevated toward the front of the truck as shown in FIG. 2, and this permits the cargo to slide off the truck in the dump bed without having to push the dump bed towards the rear very hard. Several precautions are provided for keeping the dump bed from sliding off the truck when not wanted. Thus, the tailgate 83 of the truck is adapted to be arranged in the upper position and locked. In addition the chains 53 are provided to secure the dump bed to the truck while transporting a load. In addition there is provided a locking lever or locking mechanism 56 on the front of the dump bed.

In use, with the bed loaded, one simply opens the tailgate 83, disconnects the chains 53 and prepares the bed for dumping. When the locking mechanism 56 is released and slight pressure is exserted against the dump bed it slides across the casters to the fulcrum point of the bed and load. When it reaches the fulcrum point 89, the front of the bed tilts upward and the back of the bed hits the ground as shown in FIGS. 5 and 10. At this point some of the load will start to exit the dump bed. In order to further empty the load the truck (in reverse) is backed against the dump bed further increasing the angle between the truck bed and the dump bed. The load and the bite of the dump bed with the ground keeps the dump bed from sliding back as the truck 31 is backed against the dump bed. Then, when the chains are fastened to the truck and the truck is pulled away from the load, the dump bed is returned to a vertical position within the truck bed. It is then easy to slide the dump bed into place within the truck bed, lock the same and prepare for the next load so that the cycle can be repeated.

In FIG. 1 the numeral 90 indicates stake holes in the bed of the truck for receiving the chain adjustment supports.

As to the chain loops 52 on the dump bed, these are arranged as shown in the drawings close to the fulcrum area of the dump bed. The ends of the chains 53 are connected to the loops 52, and the other ends of the chains are connected to pegs such as the pegs 55 that are adapted to fit snugly in stake holes of the truck bed.

The dump bed or box 48 has an inexpensive rugged construction and may have an arrangement such as that shown in the drawings.

As to the locking mechanism 56 this may be of the type such as that shown in the drawings so that as the handle 63 is twisted or turned, a bar or pin 62 moves up a slanted surface 61 and moves out of the lock.

As shown in the drawings any number of shims 43 can be used to achieve any desired angle. This will permit different loads to be accomodated while maintaining a constant angle between the truck bed and the dump bed. Heavier loads that depress the rear of the truck further down upon its supporting springs can be made to align themselves with lighter loads and accordingly with the capacity of the truck.

With the present invention an important aspect is that rollers or casters can be used, and in addition any type of jack mechanism can be used such as a hydraulic, screw type or the like. The jack might not be used or needed by the average purchaser of the dump body, but would definitely be needed for someone who had to dump the loads uphill.

With the present invention there has been provided an improved means for dumping a load on the ground without the use of shovel or manual labor, and the present invention is adapted for use with pickup trucks. The device is characterized by its simplicity of construction. Wherein the parts have a minimum amount of weight, and require minimum maintenance, the resultant product is low in cost. A minimum amount of mechanism is used so that a commercially sound product of simple construction is provided.

An important aspect of the present invention relates to the dump angle. It is to be noted that the design of present pickup trucks are such that the unit of the present invention works with maximum efficiency as the dump bed makes its plunge to the ground. An average 8 foot long pickup bed is only about 2½ feet off the ground at the tailgate. This means that the dump bed (slightly less than 8 feet long) travels about 4½ feet before it pivots and starts for the ground. It travels about another foot before it strikes the ground. This sets up an angle between the ground and dump bed of about 25°. This is an important feature because a 25° angle will not expel the load completely and prior efforts have not dealt with trying to increase this angle so as to completely expel the load. Prior devices have used stops and other mechanisms which in some cases make it impossible to improve this angle. The prior patents and constructions have not considered this angle and its importance of expelling the load and hence do not function with the efficiency of the present invention.

With the present invention it is possible to back against the dump bed. Also in the present invention the tracks or channel members are on the dump bed and do not slope. The casters are mounted on the removeable frame. The chains in the present invention are used to help return the dump bed to the prone position within the truck bed, and they are also used to help drag the dump bed when spreading. The present invention lifts the dump bed back to the prone position within the truck bed without physically tipping the truck bed into place. Also with the present invention it is possible to substantially increase or decrease the dump angle and this is advantageous with the late model pickup trucks presently in use.

The dumping unit of the present invention has certain other important advantages. For example the pickup truck can be backed against the dump bed to increase the dump angle. The present invention can be used for dumping a load on a hillside. The shims 43 can be used to achieve gravity dump angles. The uses of the pickup truck are not limited for the whole unit 36 can be removed from the truck bed in minutes. There is also provided a locking device in addition to a closed tailgate to prevent accidents from occuring on a highway or the like.

In addition there is no strain exerted in lifting the dump bed from the ground to a level position with the truck bed. Chains are used to hold the dump bed against the truck bed and above the fulcrum point of the dump bed so that when the truck is pulled forward the dump bed returns to a level position within the truck bed. By removing the unit of the present invention from the truck bed, the pickup truck can again become a pickup truck in a very short period of time. Thus, the present invention assures maximum effectiveness in the actual dumping operation as well as in the convertability of a pickup truck to a dump truck and back again to a pickup truck. The features of construction are provided that make it possible to increase or decrease the dump angle.

Furthermore, the parts are arranged and constructed so that it is easy to expel a heavy load. The roller frame is attached to a base that may consist of a piece of plywood that lays in the bed of the truck as indicated by the numeral 37 and this does not alter the bed of the pickup truck. The roller mechanism is easy to remove and install and will not become jammed or locked in the bed by rust or the like. The rollers are in the form of casters and they are mounted on shims to facilitate off loading. Standard casters can be used to facilitate replacement in case of damage or the like, so that maintenance is simplified. Rollers may be used at the end of the pickup bed so that the load is always on rollers. The dumper will dump it's load even if it is all loaded in the front of the dump bed. The dump bed can move freely back and forth over the end of the truck bed after the dump bed has been tilted to dump.

It is to be noted that when using such equipment heavy loads are dumped again and again throwing stress and strain over all parts of the dump mechanism as well as the pickup truck. The present invention has a construction that is rugged and simple so that there is provided an indurable rig that will give long use. Close tolerances are not necessary in the construction. The roller frame is mounted on the base or plywood member 37 and goes in and out of the pickup bed in an easy fashion. Also, the caster arrangement allows for lateral movement as the dump bed leaves the truck. The pickup can be backed against the dump bed as previously noted so that the dump angle can be increased or changed. The present invention incorporates both shims and a hinge device for allowing dumping without movement of the vehicle. The bed can be readily returned after the load has been removed, and the chains can be used for returning the bed to be level with the pickup bed so that it is then easy to push the dump bed forward and lock it in place.

The device can be made with loose tolerances so as to permit a load to shift and allow for slight bending of the different parts without putting undue stress on any of the latching mechanism. Complicated adjustments are not necessary, and it is not necessary to use a shovel to expel part of the load. The dump bed can touch the ground, and the dump angle can be increased or decreased. The shims and hinge mechanism permit the incline to be varied for various terrain as well as for various loads that are being carried. A locking device is used for securing the load to the roller frame during transportation. With the present invention the pickup truck can be backed against the dump bed to increase or decrease the dump angle. Loads can be dumped on the side of a hill from a pickup truck without having the dump bed overshoot the truck bed. By using the chains, the weight of the dump bed is lifted to a level position within the truck bed, and no weight lifting device is used. A quick conversion capability is provided. Because the casters are not mounted on the dump bed, this construction makes for easier handling of the dump bed when it is not in the pickup bed. Channels are used to reenforce the dump bed and they carry the load and are adapted to be mounted about a foot away from the side edges of the dump bed. Also, there is provided a rugged system for supporting the strain of backing against the dump bed. There is provided the heavier rear casters or rollers 73 that can withstand great stress and strain such as that which results in having a truck push it into a three thousand pound load. The casters are mounted higher to give clearance when backing against the dump bed. Chains are used to return the dump bed when the load has been dumped. This construction permits a load to be dumped without the use of a shovel and wherein the dump bed can be returned without manually lifting the same. It will therefore be seen that there has been provided a means for completely dumping a load without the use of a shovel, and there is also provided a means for returning the dump bed to the pickup bed without manually lifting it to this position. A shim system is provided for varying the caster angle, and a hinge mechanism is provided for hill dumping, and a wheel system is provided for spreading. These last named accessories may be used or may be omitted as desired or required.

Heavyduty casters 73 are provided at the rear end of the device as shown in the drawings, and these may be approximately twice as large as the six small ones and capable of holding much more weight.

Also, a load can be pushed out of the truck even if it is pointed down a slight incline. A hinge mechanism with a screw lift can be provided for elevating the caster network at the cab end of the dump bed so that gravity can then again take over and pull the load out of the truck. Such a screw mechanism is shown in FIGS. 8 and 9 and is indicated generally by the numeral 65, and this screw mechanism or jack mechanism 65 has a hinge action and a ball and socket construction may be used therewith.

Shims such as metal shims 43 can be provided between the casters and the frame upon which they are mounted. This will permit each individual to canter his casters at whatever angle that will best suit the loads being carried as well as to compensate for the weight capacity of the truck being used.

There is further provided a means for spreading load with the present invention. While this can be done by attaching the chains from the dump bed to the pickup bed and fixing the dump bed tailgate to about an 8 inch opening and then dragging the dump bed behind the truck, other accessories can be used. If the terrain that the dump bed is being dragged over does not matter there will be no problem doing this. However, if something is being spread over terrain that should not be disturbed then spreading wheels such as the wheels 74 will be necessary. These wheels may be mounted in any desired manner.

As shown in FIG. 14 a removeable member such as the wood block 75 can be added to the back of the dumper bed for such things as dumping a load of firewood in a driveway, and the driveway is indicated by the numeral 91 in FIG. 16. The wood block 75 will prevent the driveway from being damaged and can be quickly installed at times when it is needed as shown in the drawings. The block 75 may be connected to a metal frame piece 76, and suitable pipes, brackets and the like can be used for selectively maintaining these parts in place.

Having thus described the preferred embodiment of the invention it should be understood that numerous structural modifications and adaptations may be resorted to without departing from the spirit of the invention.

What is claimed is:

1. In a dumping vehicle, a pickup truck including a stationary bed, a platform moveably stationed above said bed, a plurality of frame pieces mounted on said platform, casters mounted on certain of said frame pieces, a moveable dump box having a bottom wall and side walls, channel members affixed to the lower surface of said bottom wall and slidably engaging said casters, loops affixed to the upper side portions of the dump box intermediate the ends thereof, chains having ends connected to said loops, removeable pegs connected to the pickup truck and having the chains adjustably connected thereto; a support section connected to the front end of the frame pieces, a locking mechanism operatively connected to said support section and a jack arranged contiguous to the support section and operatively connected thereto.

2. A device as claimed in claim 1 and further including shims positioned below the casters.

3. A device as claimed in claim 2 wherein the casters at the rear end of the device are of larger size than the other casters.

4. In a dumping unit for use in a pickup truck, a stationary bed on said pickup truck, a movable unit comprising a flat base above said bed, frame pieces on the upper surface of said base, a plurality of casters on said frame pieces, a support section on the front end of the base, screw jack means operatively connected to said support section, and rotatable cam locking means adjacent the front of the dumping unit.

5. A device as claimed in claim 4 and further including a tiltable body movably mounted above said base, U-shaped channel members mounted below said body and said channel members slidably engaging said casters.

6. A device as claimed in claim 5 and further including chains connected intermediate the ends of the dumping unit at the fulcrum points thereof.

7. A device as claimed in claim 6 and further including a tailgate for the pickup truck, and a hingedly mounted tailgate for the moveable body.

8. A device as claimed in claim 7 and further including gravel distributing wheels operatively connected to the body.

9. A device as claimed in claim 8 and further including cushion blocks for preventing damage to a driveway and the like when a load of material is being dumped into the driveway.

* * * * *